Aug. 1, 1961     O. J. BALTZER     2,994,872
RADIO DIRECTION FINDING
Filed Dec. 22, 1958     2 Sheets-Sheet 1

INVENTOR.
OTTO J. BALTZER
BY
ATTORNEYS

INVENTOR.
OTTO J. BALTZER
BY
ATTORNEYS

_United States Patent Office_

2,994,872
Patented Aug. 1, 1961

2,994,872
RADIO DIRECTION FINDING
Otto J. Baltzer, Austin, Tex., assignor to the United States of America as represented by the Secretary of the Air Force
Filed Dec. 22, 1958, Ser. No. 782,340
12 Claims. (Cl. 343—123)

The present invention relates to direction finding, and more particularly, to R-F energy detection and display methods and circuitry having marked utility for direction finding purposes.

The present invention is especially useful for detecting the output of an R-F energy source and for converting R-F energy into intelligence signals from which the azimuth sense and elapsed time between successive inputs of said energy can be accurately ascertained. As such, the system of the present invention is especially suitable for use in the meteorological work wherein atmospheric disturbances including noise and static, commonly called sferics, is of interest. Such atmospheric disturbances will hereinafter be referred to as sferics bursts.

These sferics bursts often occur in the upper atmosphere and remote from meteorological stations set up to monitor the occurrence thereof. The existence and location of these bursts may be ascertained at points remote therefrom by means of the electromagnetic energy radiated from such phenomena. This energy arises from sudden electrical impulses, representative of current flow, such as that accompanying lightning discharges.

Conventional direction finding systems use loop antennas disposed at 90-degree angles and balanced receive channels connected and energized by the outputs of said loop antennas to generate Lissajous patterns on a cathode ray tube of an oscilloscope to monitor the time and angle of arrival of sferics bursts. The cathode ray tube display generally moves in and out at a radio frequency in the 8 to 12 kilocycle range so that a single sferics of, for example, one millisecond duration will give 10 discrete line traces on the cathode ray tube. The multiplicity of traces displayed on the cathode ray tube makes the determination of the time and angle of arrival of the sferics burst more difficult and less accurate and increases the consumption of film required to record the displayed trace for future analysis, if such analyzing means is employed.

It is an object of the present invention to provide a detection and display system for improving the information obtainable from the reception of R-F energy from a source, including sferics bursts from meteorological phenomena.

It is a second object of the present invention to provide a detection and display system for improving the information obtainable from the reception of R-F energy, including sferics bursts occurring remotely from a monitoring station set up to record the occurrences of such phenomena.

It is a third object of the present invention to provide an improved detection and display system for R-F energy, including sferics bursts, by receiving said energy in separate signal channels and deriving signals therefrom representative of the azimuth origin of said energy to drive an indicator device from which the azimuth origin of said energy can be ascertained more accurately.

It is a fourth object of the present invention to provide an improved detection and display system for R-F energy, including sferics bursts, by receiving said energy in separate, identical signal channels, including a phase-sensitive device for deriving signals therefrom having azimuth sense to drive an indicator device from which the azimuth origin of said energy can be ascertained uncomplicated by the frequency of said R-F energy.

It is a fifth object of the present invention to provide an improved detection and display system for R-F energy, including sferics bursts, by providing input signals to separate signal channels dependent upon the azimuth origin of said R-F energy, and by comparing the phase of said signals to said R-F energy to generate signals therefrom having azimuth sense to drive an indicator device from which the azimuth origin of said R-F energy can be ascertained uncomplicated by the substantially high frequency of said R-F energy.

It is a sixth object of the present invention to provide an improved detection and display system for R-F energy, including sferics bursts, from a remote source by providing input signals to separate signal channels dependent upon the azimuth origin of said R-F energy, and by comparing the phase of said signals to said R-F energy at a phase-sensitive detector device to generate signals having azimuth sense to drive an indicator device from which the azimuth origin of said R-F energy can be determined uncomplicated by the substantially high frequency of said R-F energy.

It is a seventh object of the present invention to provide an improved method for detecting and displaying R-F energy, including sferics bursts, from a remote source by providing input signals to separate signal channels dependent upon the azimuth origin of said R-F energy, and by gating a phase-sensitive device responsive to said input signals with another R-F signal to generate rectified signals, having azimuth sense, dependent upon the phase relationship between said input signals and gating signal, and energizing an indicator device with the rectified signals of each signal channel.

Accordingly, the present invention involves a detection and display system for ascertaining the origin and time of arrival of R-F energy, including sferics bursts generated by meteorological phenomena. Separate, identical signal channels are employed for generating signals representative of received R-F energy to obtain desirable information therefrom. Each channel is coupled to the output of a loop antenna, said loop antennas being disposed at right angles with respect to each other to develop signals, having phase and magnitude dependent upon the cosine and sine of said R-F energy impinging thereon. A phase-sensitive device is included in each channel. One input to the phase-sensitive device is out of phase signals generated from the output of the loop antenna coupled to the channel. Another input to the phase-sensitive device is out of phase signals generated by a sense amplifier coupled to each channel. The input to the sense amplifier is the output of a conventional whip antenna. Rectified signals are developed in each channel by the phase-sensitive device, said rectified signals having sense and magnitude dependent upon the phase relationship between the inputs from the loop antenna and the whip antenna, which is dependent upon the azimuth origin of the R-F energy. An indicator device, such as an oscilloscope, may be connected to and energized by the rectified signals generated by the phase-sensitive devices for recording the azimuth origin and time of arrival of said R-F energy.

These objects and others and advantageous features of the present invention will be forthcoming from the following detailed description taken in conjunction with the accompanying drawings wherein.

Figures 1, 2:
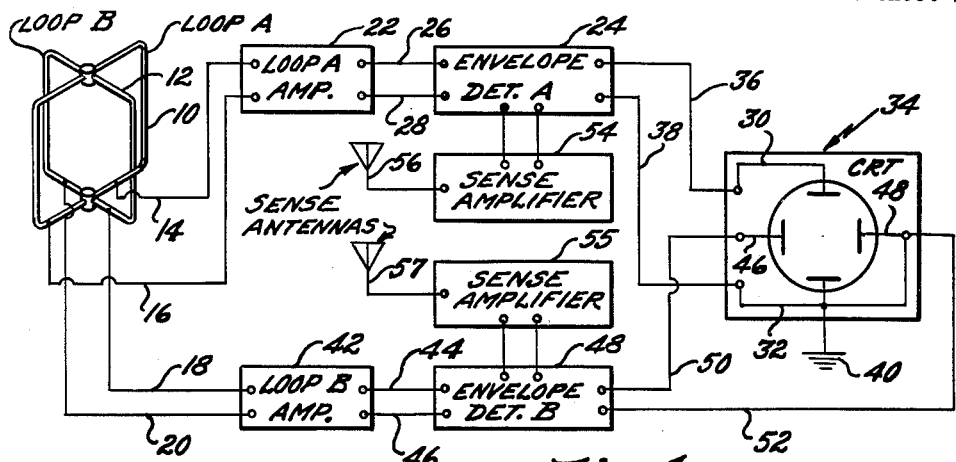
FIG. 1 is a block diagram of the detection and display system of the present invention.
FIG. 2 is a schematic diagram of an embodiment used to describe the system of the present invention.

Referring now to FIG. 1, there is shown the system of the present invention. Two loop antennas 10 and 12, displaced from each other in azimuth by 90 degrees so as to receive signals with amplitudes proportional to the sine and cosine of angle $\theta$, where $\theta$ is the azimuth angle with respect to the axis of one of the loops, are coupled to a separate channel A and B via leads 14 and 16 and 18 and 20. Channel A is comprised of a loop A amplifier 22 and a phase-sensitive, envelope detector A, designated by reference symbol 24, to be described more fully subsequently. The output of the amplifier 22 is coupled to the detector 24 via leads 26 and 28. The output of the detector is coupled to the vertical deflection plates 30 and 32 of a conventional cathode ray tube of an oscilloscope 34 via leads 36 and 38. One plate 32 may be connected to a common ground 40. Channel B is similar to channel A. The input from loop antenna 12 is coupled to a loop B amplifier 42, and applied via leads 44 and 46 to a phase-sensitive, envelope detector B, designated by reference symbol 48, which is identical to that employed in channel A. The output of the detector is coupled to the horizontal deflection plates 46 and 48 of the cathode ray tube of the oscilloscope 34 via leads 50 and 52. One plate 48 is preferably connected to the common ground 40 for proper deflection of the electron beam.

Under normal operating conditions, the input to the amplifiers will consist of R-F signal energy, such as a sferics burst, having frequencies in the range of 8 to 12 kilocycles, so that the amplifiers preferably have suitable bandpass for this frequency range.

A switching or modulating signal is coupled to both detectors to obtain full sensing information in all four azimuth quadrants. The modulating signal is generated in a sensing amplifier 54 or 55 connected to and responsive to the output of a conventional whip antenna 56 or 57, respectively. Alternately, a single amplifier energized by the output of the whip antenna may be employed to energize a sensing amplifier the output of which is coupled to the phase-sensitive, envelope detector in each channel. The output of the whip antenna likewise consists of R-F energy resulting from a sferics burst. Preferably, said amplifier or amplifiers also have sufficient bandpass to accommodate frequencies within 8 to 12 kilocycles.

The output of the envelope detectors 24 and 48 consist of rectified R-F energy pulses; however, phase-sensitive detection is employed to prevent loss of the angle or azimuth quadrant wherein the signal is generated. Thus, since a sferics burst usually consists of 5 to 10 "wiggles" of R-F energy at frequencies between 8 to 12 kilocycles, the envelope of these wiggles contains the same direction finding information as that contained in any single R-F energy cycle. Use of the envelope rather than R-F cycles results in new and novel aspects described in detail subsequently.

Referring now to FIG. 2, there is shown schematically the circuitry of a single channel, which may conveniently be the channel A. Both channels being identical, the circuitry and description will be applicable to both channels.

The output of the loop antenna 10 is coupled to a primary winding 60 of a transformer 62. A secondary winding 64, having a center tap 66 returned to a common ground 68 is connected to control grids 70 and 72 of electron discharge devices V1 and V2, which function as amplifiers and may be one or more multi-element devices as is well known to persons skilled in the prior art. Cathodes 74 and 76 of amplifiers V1 and V2 are connected together and returned to the common ground via a common biasing resistor 78. Anodes 80 and 82 of amplifiers V1 and V2 are returned to B+ sources 84 and 86, which are preferably maintained at the same potential, through load resistors 88 and 90. The amplified output of the V1 is coupled to an anode 92 and a cathode 94 of an electron discharge device V3, which functions as a phase-sensitive, envelope detector, through a capacitor 96. The anode 92 and cathode 94 are returned to the common ground 68 through a resistor 98. Another anode 100 and cathode 102 of the envelope detector V3 is connected through serially connected resistors 104 and 106 to an anode 108 and a cathode 110 of an electron discharge device V4, which functions as a phase-sensitive, envelope detector V4. Another anode 112 and cathode 114 of envelope detector V4 are connected to the output at the anode 82 of amplifier V2 through a capacitor 116, and are connected to the common ground through a resistor 118. Control grids 120 and 122 and 124 and 126 of the envelope detectors V3 and V4 are connected together and to the output of electron discharge devices V5 and V6, which function as sense amplifiers, to feed a switching, or modulating, phase-sensed auxiliary signal to grids 120, 122, 124, and 126 and thereby cause the signals entering twin triodes V3, V4 to be modulated by the signals received at sense antenna input transformer 132, whereby there is obtained, at the output junction 182, full sensing information from all azimuthal quadrants.

The amplifiers V5 and V6 are conventional amplifiers preferably capable of amplifying input R-F energy between 8 and 12 kilocycles as previously mentioned. These amplifiers may include one or more multi-element devices as is well known to persons skilled in the prior art.

Other circuits suitable for acting as phase-sensitive, envelope detectors will be described subsequently and said circuits are not in any way limited to the duo-triode discharge devices previously described.

The output of the vertical whip antenna 56 is coupled to a primary winding 130 of a transformer 132. A secondary winding 134, having a center tap 136 connected to the common ground 68, is connected to control grids 138 and 140 of amplifiers V5 and V6. Cathodes 142 and 144 of amplifiers V5 and V6 are connected together and returned to the common ground through a common biasing resistor 146. An anode 148 of the amplifier V5 is connected through a load resistor 150 to a B+ source 152. An anode 154 of the amplifier V6 is connected through a load resistor 156 to a B+ source 158. The B+ sources 152 and 158 are preferably at the same potential, and may be identical with the sources 84 and 86.

The amplified output of the amplifier V5 is coupled through a capacitor 160 and a limiting resistor 162 to the control grids 120 and 122 of the envelope detector V3. The control grids 120 and 122 are also returned to the common ground through the resistor 162, a resistor 164, and a wiper arm 166 of a potentiometer 168. The potentiometer is part of a voltage divider 170, consisting of said potentiometer and a resistor 172 connected between a negative source 174, such as −105 volts, and the common ground. The setting of the wiper arm 166 adjusts the bias voltage applied to the control grids of the envelope detector V3. Similarly, the output of the device V6 is coupled through a capacitor 176 and a limiting resistor 178 to the control grids 124 and 126 of the envelope detector V4. The control grids are also returned to the common ground through the resistor 178, a resistor 180, and the wiper arm of the potentiometer 168.

Loop antenna 10 is mounted so that it has its plane vertical in the north-south direction, and loop antenna 12 is mounted so that it has its plane vertical in the east-west direction. Consequently, for signals arriving along the ground the output voltage of the loop antenna 10 will be proportional to the cosine of the azimuth angle, while the output of the loop antenna 12 will be proportional to the sine of the same angle. The two loop antennas being identical, their output voltages will be identical in waveshape and in phase and the magnitude of the voltages will be equal for signals arriving at azimuth angles of 45, 135, 225, and 315 degrees, whereas for all other angles the magnitude ratio will vary as a function of the azimuth angle of the incoming signal. Accordingly, due to the center-tapped secondary winding 64 of transformer 62, the signals at the anodes 80 and 82 of the amplifiers V1 and V2 are 180 degrees out of phase with respect to each other. Additionally, since the secondary winding 134 of the transformer 132 is center tapped, the signals at the anodes of amplifiers V5 and V6 are 180 degrees out of phase with respect to each other. Thus, the signals applied to the control grids 120 and 122, and 124 and 126 are 180 degrees out of phase with respect to each other, and may be, in phase or out of phase with the signals applied to the anodes and cathodes of envelope detectors V3 and V4, respectively, from the amplifiers V1 and V2.

The conductive periods of envelope detectors V3 and V4 are dependent upon the setting of the wiper arm 166, which establishes the D.-C. level of the signals applied to the control grids thereof, the phase and magnitude of the signals applied to the anodes and the cathodes of said envelope detectors V3 and V4, and the phase and magnitude of the signals coupled to said control grids from the amplifiers V5 and V6. Envelope detectors V3 and V4 can be likened to gated bidirectional rectifiers.

Rectified pulse signals generated by envelope detectors V3 and V4 at the point 182 between the resistors 104 and 106 will be either positive or negative depending on the phase relationship between signals developed in the loop channel and the sense signals causing either the left or right hand portion of the envelope detectors V3 or V4 to conduct. Additionally, the amplitude of rectified signals at point 182 is proportional to the average amplitude of the input signals to the loop channel. The envelope detection principle involved here is not simply that of rectification of the R-F signal outputs of amplifiers V1 and V2 in loop A or B, but rather, involves phase-sensitive detection in which an auxiliary signal, derived from sense amplifiers V5 and V6, is used as a switching or modulating signal to obtain full sensing information in all four azimuth quadrants. Simple rectification or detection would squeeze all traces into one quadrant with resulting ambiguity in the angle of arrival of input signals.

R-F components present in rectified signals are removed by a filter circuit 184 comprised of capacitors 186 and 188 connected at one end thereof to a resistor 190 and connected at another end to the common ground. The filtered signal is applied to a control grid 192 of an electron discharge device V7, which functions as an output amplifier. A bias resistor 194 is connected to the control grid 192 and to the common ground. A cathode 196 is connected to the common ground through a bias resistor 198. An anode is connected to a B+ source 200 through a load resistor 202. The B+ source 200 can be identical with the B+ sources 84, 86, 156, and 158, or different depending upon the voltage requirements of the amplifier. Amplified pulses generated between the anode and the common ground are coupled through a capacitor 204 to a pair of deflection plates, such as the horizontal plates, of the cathode ray tube. In a similar manner, signals are generated for a second pair of deflection plates of the cathode ray tube in the channel B.

Figure 3:
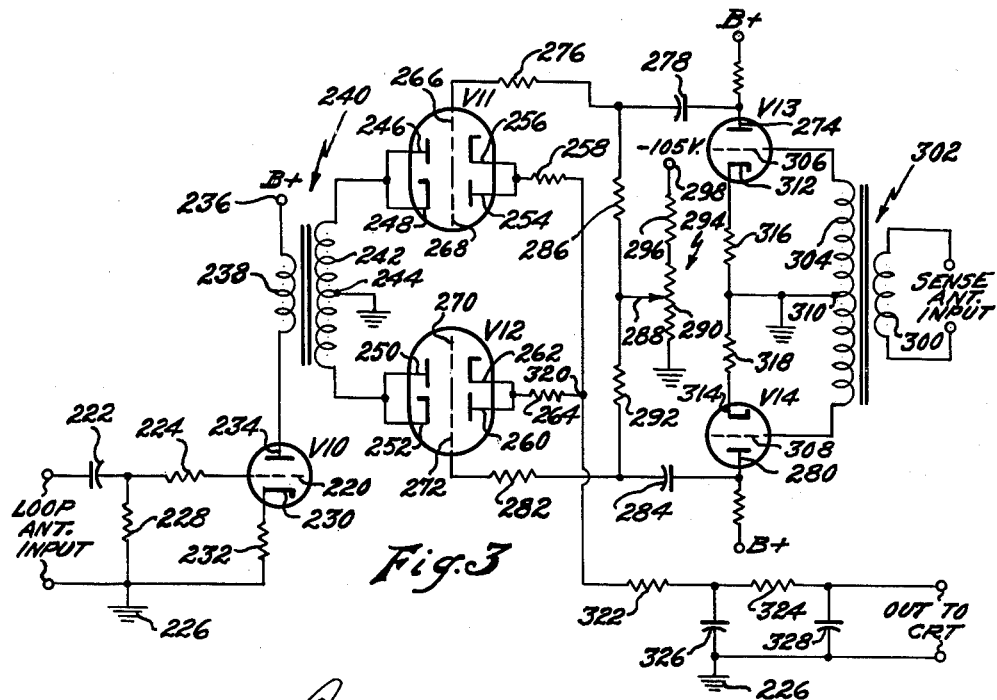
FIG. 3 is a schematic diagram of another embodiment of the system of the present invention which is a modification of that depicted in FIG. 2.

An alternate embodiment for accomplishing the same purposes previously set forth is shown in FIG. 3. Fundamentally, this circuit is similar to the one described and shown in FIG. 2 and the same circuit is employed in the channels A and B for driving the two pairs of deflection plates of the cathode ray tube included in a conventional oscilloscope. Once again, only the description for the circuit included in one channel is set forth and the analysis will apply to the circuit included in the other channel.

The output from the loop antenna is coupled to a control grid 220, of electron discharge devices V10, which functions as a conventional amplifier, through a capacitor 222 and a limiting resistor 224. The control grid is also returned to the common ground 226 through a resistor 228. A cathode 230 is returned to ground through a bias resistor 232. An anode 234 is connected to a B+ source 236 through a primary winding 238 of a transformer 240, said primary winding also functioning as an anode load. A secondary winding 242 of the transformer has a center tap 244 connected to the common ground for splitting the phase of amplified signals developed in said secondary winding. Amplified signals developed between the center tap 244 and one side of the secondary winding are coupled to an anode 246 and a cathode 248 of an electron discharge device V11, functioning as a phase-sensitive, envelope detector. Amplified signals developed between the center tap 244 and another side of the secondary winding 242 are coupled to an anode 250 and a cathode 252 of an electron discharge device V12, functioning as a phase-sensitive, envelope detector. Said envelope detectors are otherwise identical to envelope detectors V3 and V4 described previously. An anode 254 and a cathode 256 of envelope detector V11 are connected together and to a resistor 258 while an anode 260 and a cathode 262 of envelope detector V12 are connected together and to a resistor 264. Another end of the resistors 258 and 264 are connected together and the outputs of said envelope detectors V11 and V12 are developed across these resistors. Control grids 266 and 268 of V11 and 270 and 272 of V12 are connected together. The control grids 266 and 268 are coupled to an anode 274 of an electron discharge device V13, functioning as a sense amplifier, through a limiting resistor 276 and a capacitor 278. Similarly, the control grids 270 and 272 are coupled to an anode 280 of an electron discharge device V14, functioning as a sense amplifier, through a limiting resistor 282 and a capacitor 284. Control grids 266 and 268 are returned to the common ground through the resistor 276, a resistor 286, and the wiper arm 288 of a potentiometer 290. Similarly, the control grids 270 and 272 are returned to the common ground through the resistor 282, a resistor 292, and the wiper arm 288. The potentiometer 290 is part of a voltage divider 284 together with a resistor 296, connected between a negative source 298 and the common ground. Adjustment of the wiper arm 288 controls the bias applied to the control grids of the envelope detectors V11 and V12. As in the sense amplifier previously described, the output of the whip antenna is coupled to a primary winding 300 of a transformer 302. A secondary winding 304 is coupled at the ends thereof to control grids 306 and 308 of amplifiers V13 and V14. The secondary winding has a center tap 310 connected to the common ground so that signals applied to said control grids are 180 degrees out of phase with respect to each other. Cathodes 312 and 314 of said amplifiers V13 and V14 are connected to the common ground through resistors 316 and 318, respectively. Amplified signals developed at the anodes 274 and 280 are 180 degrees out of phase with respect to each other.

Rectified signals, representative of the envelopes of input sferics bursts, developed by the envelope detectors V11 and V12 at the junction 320 of resistors 258 and 264 are coupled to a filter circuit consisting of serially connected resistors 322 and 324 and parallel connected capacitors 326 and 328. These signals are either positive or negative depending on the phase relationship between the loop amplifier output and the sense amplifier outputs. Filtered signals are available to be coupled to the deflection plates of a cathode ray tube across the capacitor 328. An output amplifier is not required in this embodiment since output signals with proper magnitude are developed by the proper selection of circuit components.

The operation of amplifiers V10, V13, and V14 and envelope detectors V11 and V12 is identical to that given previously for the previous embodiment, except for the minor changes in circuit components.

One of the principal underlying aspects of the present invention is the use of a phase-sensitive, envelope detector. The specific detector circuit could use diodes in place of the triodes.

Figure 4:
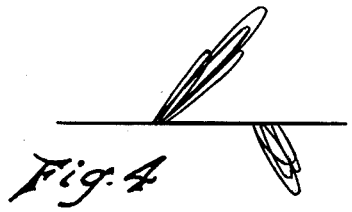
FIG. 4 depicts a Lissajous pattern obtainable with a conventional detection and display system.
Figure 5:
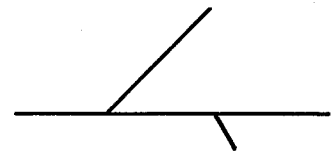
FIG. 5 depicts a pattern obtainable with the system of the present invention.

Many novel aspects and advantages are forthcoming from the use of the detection and display system of the present invention. This is exemplified in the adaptation of the system to the detection and display of sferics bursts wherein an oscilloscope is employed as the indicator device. Firstly, whereas in conventional systems not incorporating a phase-sensitive, envelope detector, a multiplicity of traces are generated from a single sferics burst, in the present invention only one line trace is displayed on the oscilloscope. The difference is shown by the traces depicted in FIGS. 4 and 5, wherein the trace shown in FIG. 4 is comprised of a multiplicity of traces and that shown in FIG. 5 is the pattern obtainable for a single sferics bursts using the system of the present invention. This reduction in the number of traces is particularly important whenever the successive cycles of a sferics burst are loopy or are not superimposed on one another. This reduction eases the analysis problem associated with filmed recordings of the oscilloscope display. Secondly, the use of the sferics display system virtually eliminates tails displayed with the main sferic burst. In conventional sferic devices, all channels must be accurately balanced in phase since any phase deviation results in loopiness or in tails. Thirdly, the use of the sferics display system improves film recording techniques for analyzing the display of the system since it is no longer necessary to film separate R-F cycles occurring at approximately a 10 kilocycle rate. The single, relatively slower moving trace resulting from a sferics burst is infinitely more readily filmed than R-F cycles at a 10 kilocycle rate. Fourthly, the time of arrival of a sferics burst can be estimated more accurately since the start of the signal occurs as an abrupt discontinuity in the base line trace with a conventional sferics display system and under loopy signal conditions, it becomes difficult to determine the time of arrival of signals in analyzing film recordings, especially those obtainable with slow camera speed. Fifthly, the arrival angle of sferics signals can be determined with a great deal more precision since confusion is eliminated concerning the zero axis cross points. Confusion is usually experienced with conventional sferics displays. Furthermore, the amount of noise and fluctuation of the cathode ray tube display is greatly reduced since the phase-sensitive, envelope detector rectifies many R-F cycles, thereby filtering out considerable receiver noise or any other noise not directly derived from an actual sferics signal. Even strong local disturbances which normally result in circular or elliptical display patterns are reduced.

Figure 6:
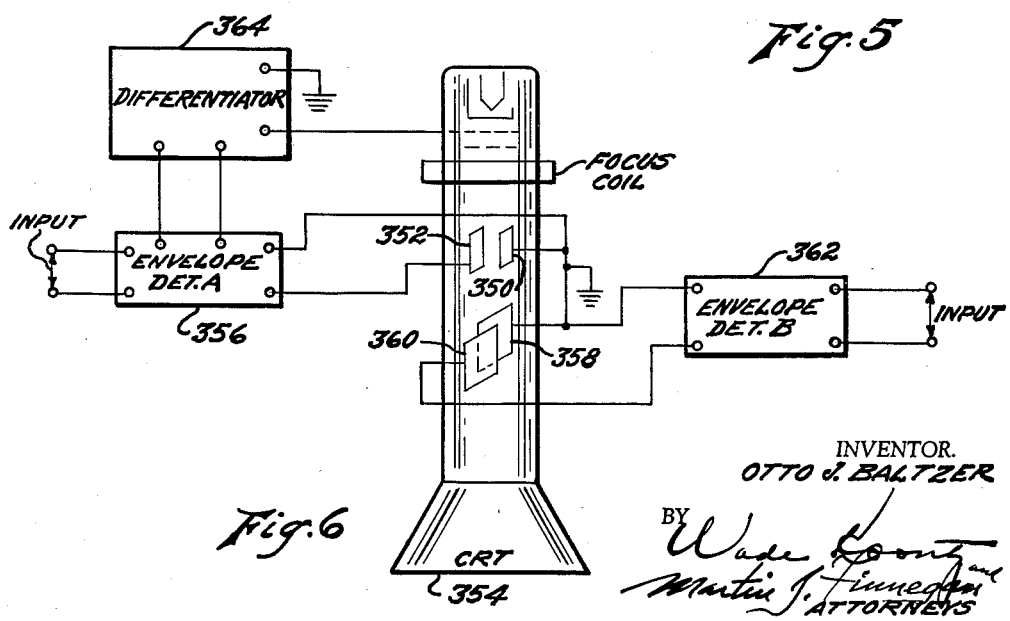
FIG. 6 depicts in block diagram form a portion of the embodiments shown in FIGS. 2 and 3 wherein the output of an envelope detector is employed for supplying a grid of a cathode ray tube with an intensifying signal.

Intensification of the cathode ray tube display, Z axis modulation, may be desirable and can be obtained in various ways, as for example, from the R-F sense signal directly; from simple rectification, either full or half wave, of the R-F sense signal; from either of the phase-sensitive, envelope detector outputs in channel A or B; or from a suitable combination of the above in conjunction with suitable filters. One desirable manner could be obtained by using the differentiated output signal from one or both of the envelope detectors to give an intensification signal based upon the velocity of the cathode ray tube trace. Application of the differentiated output signal to a grid of the cathode ray tube would tend to give more nearly uniform brightening at all points along the trace. The block diagram depicted in FIG. 6 illustrates the aforementioned arrangement. A pair of vertical deflection plates 350 and 352 of a conventional cathode ray tube 354 are connected to and energized by the output of a phase-sensitive, envelope detector A, designated by the reference symbol 356. A pair of horizontal deflection plates 358 and 360 are connected to and energized by the output of a phase-sensitive, envelope detector B, designated by the reference symbol 362. Envelope detectors A and B are of the same type as mentioned previously in regard to the embodiments depicted in FIGS. 2 and 3. Additionally the output of the envelope detector A is coupled to a conventional differentiator circuit 364 for developing an intensifying signal for a grid of the cathode ray tube to improve the quality of the display thereon.

Having described the principles of the present invention it is desirable that the invention not be limited to the particular embodiments used to describe the invention as other embodiments will present themselves to persons skilled in the art without departing from the spirit and scope thereof. It is desirable that the present invention be interpreted by the appended claims.

What I claim is:

1. The method of determining the origin of a source of R-F energy and the interval between successive impulses of said energy which comprises the steps of receiving said R-F energy in separate signal channels and deriving from said R-F energy independent signals dependent upon the azimuth origin of said R-F energy, receiving said R-F energy and converting said R-F energy into phase-sensitive auxiliary signals, generating rectified signals with azimuth sense by modulating said independent signals with said phase-sensitive auxiliary signals, and recording said modulated and rectified signals.

2. The method of determining the origin of a source of R-F energy and the interval between successive impulses of said energy which comprises the steps of receiving said R-F energy in separate signal channels and deriving from said R-F energy separate signals dependent upon the azimuth origin of said R-F energy, receiving said R-F energy independently and converting said R-F energy into phase-sensitive auxiliary signals, utilizing said auxiliary signals to gate said first-named signals and develop therefrom modulated and rectified signals having azimuth sense corresponding to that of the originating R-F energy, and recording said modulated and rectified signals.

3. In a direction finding system, comprising dual signal channels each including first means responsive to R-F energy for generating signals dependent upon the azimuth quadrant wherein said R-F energy originates, second means responsive to said R-F energy for generating amplified signals therefrom, electron discharge means having control grids responsive to signals generated by said second means to modulate the signals generated by said first means and thereby produce signals dependent upon the phase relationship between the signal output of said first and second means, and means connected to and responsive to the output of said electron discharge means for recording the origin of said R-F energy.

4. In a direction finding system, comprising dual signal channels each including first phase-splitting means responsive to R-F energy for generating first signals dependent upon the azimuth quadrant wherein said R-F energy originates, second means responsive to said R-F energy for generating amplified auxiliary signals, vacuum tube modulation means having control grids receiving said auxiliary signals and thereby generate signals dependent upon the phase relationship between said first signals and said auxiliary signals, and means connected to and responsive to the output of said vacuum tube modulated means for recording the origin of said R-F energy.

5. In a direction finding system, comprising dual signal channels each including first phase-splitting means responsive to R-F energy for generating signals dependent upon the azimuth quadrant wherein said R-F energy originates, second phase-splitting means responsive to R-F energy for generating amplified signals to sense-modulate said first-named signals, vacuum tube means having input electrodes connected to said first phase-splitting means and control grids connected to said second phase-splitting means and responsive to signals generated therein for producing signals with azimuth sense dependent upon the phase relationship between said signals generated in said phase-splitting means, and means connected to and responsive to the output of said vacuum tube means for recording the origin of said R-F energy.

6. In a direction finding system, comprising dual signal channels each including first means responsive to R-F energy for generating signals dependent upon the azimuth quadrant wherein said R-F energy originates, second means responsive to said R-F energy for generating amplified signals therefrom, vacuum tube means having input electrodes connected to said first and second R-F energy means and control grids connected to said second means and responsive to R-F energy signals generated therein for generating a signal dependent upon the R-F envelope of said R-F energy and the phase relationship of said R-F energy, and means connected to and responsive to the output of said vacuum tube means for recording the origin of said R-F energy.

7. In a direction finding system, comprising dual identical signal channels each including first means responsive to R-F energy for generating signals dependent upon the azimuth quadrant wherein said energy originates, second means responsive to said R-F energy for generating auxiliary signals, phase-sensitive vacuum tube modulation means connected to said first and second means and responsive to signals generated therein for generating a signal with azimuth sense dependent upon the phase relationship of said signals, said signal of said phase-sensitive means having a pulse shape dependent upon the envelope of said signals of said first and second means, and means connected to and responsive to the output of said phase-sensitive vacuum tube modulation means for recording the time of arrival and direction of said R-F energy.

8. In a direction finding system, comprising dual signal channels each including antenna means disposed in predetermined azimuth quadrants, first means connected to said antenna means and responsive to R-F energy flowing in said antenna means for generating signals dependent upon the azimuth quadrant wherein said energy originates, second means responsive to said R-F energy for generating amplified signals therefrom, phase-sensitive vacuum tube modulation means connected to said first and second R-F energy means and responsive to signals generated therein for generating a rectified signal dependent upon the phase of said signals of said first and second means, and means connected to said phase-sensitive vacuum tube modulation means for recording the time of arrival and azimuth of said R-F energy.

9. In a direction finding system, comprising dual signal channels each including first antenna means disposed in predetermined azimuth quadrants for receiving R-F energy, first phrase-splitting amplifying means connected to said first antenna means and responsive to the output thereof for generating signals, second antenna means for receiving said R-F energy, second phase-splitting amplifying means connected to said second antenna means and responsive to the output thereof for generating auxiliary signals, vacuum tube modulation means connected to said first and second phase-splitting means for generating rectified signals dependent upon the phase relationship between said signals of said first and second phase-splitting means, and means responsive to said modulated rectified signals for recording the origin of said R-F energy.

10. In a direction finding system, comprising dual signal channels each including first antenna means disposed in pretermined azimuth quadrants for receiving R-F energy, first phase-splitting amplifying means connected to said first antenna means, second antenna means for receiving said R-F energy, second phase-splitting amplifying means connected to said second antenna means, phase-sensitive vacuum tube modulation means connected to said first and second phase-splitting amplifying means for generating said modulated rectified signals with azimuth sense dependent upon the phase relationship between said signals of said first and second phase-splitting amplifying means, and means responsive to rectified signals for recording the origin of said R-F energy and the interval between successive inputs of said R-F energy.

11. In a direction finding system, comprising dual signal channels including first and second antenna means disposed in predetermined azimuth quadrants, first means connected to one of said first and second antenna means and responsive to R-F energy flowing in said one of said first and second antenna means for generating signals dependent upon the azimuth quadrant wherein said energy originates, third antenna means responsive to said R-F energy, second means connected to said third antenna means for generating amplified signals, vacuum tube modulation, means connected to said first and second means for generating rectified signals having azimuth sense dependent upon the phase relationship of said outputs of said first and second means, said amplified signals of said second means being a gating signal for said vacuum tube modulation means, and means responsive to said rectified signals for recording the time of arrival and azimuth of said R-F energy.

12. In a direction finding system, comprising dual signal channels including first and second antenna means disposed in predetermined azimuth quadrants, first means connected to one of said first and second antenna means and responsive to R-F energy flowing in said one of said first and second antenna means for generating signals dependent upon the azimuth quadrant wherein said energy originates, third antenna means responsive to said R-F energy, second means connected to said third antenna means for generating amplified signals, means including vacuum tube modulation means having input electrodes connected to said first means and control grids connected to said second means and responsive to the outputs thereof for generating modulated rectified signals having azimuth sense dependent upon the phase relationship of said outputs of said first and second means, visual indicator means responsive to said modulated rectified signals for recording the time of arrival and azimuth of said R-F energy, and means connected to said visual indicator means and responsive to said rectified signals for providing intensifying signals to said indicator means dependent upon the velocity of the displayed trace of said visual indicator means.

References Cited in the file of this patent

UNITED STATES PATENTS

| | | |
|---|---|---|
| 1,839,290 | Bailey | Jan. 5, 1932 |
| 2,861,264 | Lair | Nov. 18, 1948 |
| 2,883,663 | Kessler | Apr. 21, 1959 |